United States Patent Office 2,830,049
Patented Apr. 8, 1958

2,830,049
ACETYLENIC TETRAHYDROISOQUINOLINE DERIVATIVES

John H. Biel, Milwaukee, Wis., assignor to Lakeside Laboratories, Inc., a corporation of Wisconsin No Drawing. Application May 28, 1956
Serial No. 587,488

15 Claims. (Cl. 260—247.5)

This invention relates to the production of novel chemical compounds. More particularly, this invention is concerned with novel alkyne derivatives of 1,2,3,4-tetrahydroisoquinoline and processes of preparing such compounds.

According to the present invention there are provided compounds of the formula

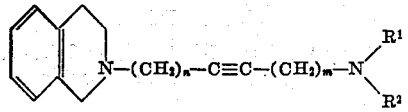

wherein $n$ and $m$ are integers from 1 through 10, and

is a secondary amino group such as a dialkylamino group, particularly such groups in which the alkyl moieties are lower alkyls, groups in which the nitrogen is part of a heterocyclic structure, i. e., $R^1$ and $R^2$ are joined to each other and form a ring, such as N-pyrrolidino, N-piperidino and N-morpholino, lower alkenyl groups, aralkyl groups and aryl groups, particularly monocyclic aralkyl and aryl groups, and acid addition and quaternary ammonium salts thereof. Also provided are processes of producing these compounds and intermediate compounds useful in such processes.

Production of such compounds is effected by reacting an appropriate dihaloalkyne of the formula $$Y-(CH_2)_n-C{\equiv}C-(CH_2)_m-Y$$

with an amine of the formula

to produce a compound of the formula

which is reacted with a 1,2,3,4-tetrahydroisoquinoline of the formula

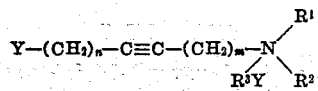

to produce the desired compounds of the formula

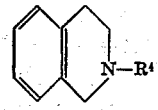

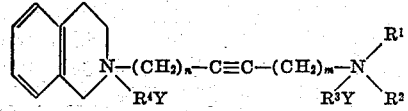

wherein $R^1$, $R^2$, $m$ and $n$ have the significance assigned above, Y is bromine, chlorine or iodine, and $R^3$ and $R^4$ are hydrogen or lower alkyls.

Representative of the dihaloalkynes which may be used in the first step of this process are 1,4-dibromo-2-butyne, 1,5-dichloro-2-pentyne, 1,6-dichloro-3-hexyne, 1,7-dichloro-3-heptyne, 1,8-diiodo-4-octyne, 1,12-dibromo-6-dodecyne, 1,15-dibromo-7-pentadecyne, and the like.

As indicated by the formula above, both secondary and tertiary amines may be used in the process, including the amines trimethylamine, triethylamine, tributylamine, dimethylamine, diethylamine, dipropylamine, diallylamine, methylethylamine, dibenzylamine, diphenylamine, pyrrolidine, morpholine, piperidine, methylaniline, and dibenzylmethylamine.

The dihaloalkyne and secondary or tertiary amine are conveniently contacted in the presence of an inert organic solvent for effecting the reaction. Examples of suitable solvents that may be used are toluene, benzene, acetonitrile, chloroform, pentane and lower alcohols. Generally, the reaction proceeds at room temperature although elevated temperatures such as the reflux temperature may be employed to promote the reaction. The reaction is usually terminated in about 1 to 12 hours or at such earliest time as it is essentially complete. The desired product may be recovered from the reaction mixture by conventional methods. Thus, if the product precipitates from the reaction mixture it may be filtered and purified by recrystallization from a suitable organic solvent. Products formed which are soluble in the reaction medium may be recovered by evaporation of the solvent.

The amino-halo-alkynes so produced may be recovered directly in the form of acid addition salts or quaternary ammonium salts depending on the amine reactant employed. The use of secondary amines gives a hydrohalic acid by-product which immediately forms an acid addition salt with the product. Tertiary amines having an alkyl group form alkyl esters of the halogen acids as by-products (i. e., methyl chloride) which combine with the product to form the corresponding quaternary ammonium salt. By contacting the acid addition salts with an inorganic basic material the corresponding free base may be obtained.

Typical of the compounds produced according to this first step are 1-dimethylamino-4-bromo-2-butyne, 1-bromo-4-pyrrolidino-2-butyne, 1-chloro-5-morpholino-2-pentyne, 1-chloro-6-piperidino-3-hexyne, 1-chloro-7-diallylamino-3-heptyne, 1-iodo-8-diethylamino-4-octyne, 1-bromo-12-dibutylamino-6-dodecyne and 1-bromo-15-morpholino-7-pentadecyne and hydrohalic acid addition and alkylhalo quaternary ammonium salts thereof.

As previously shown, the amino-halo-alkyne-intermediates, or salts thereof, may be subsequently reacted with 1,2,3,4-tetrahydroisoquinoline or an N-alkyl-1,2,3,4-tetrahydroisoquinoline to form the desired aminoalkynyl-tetrahydroisoquinoline. The N-alkyl-1,2,3,4-tetrahydroisoquinolines which may be used in this process are those in which the N-alkyl groups are lower alkyls such as methyl, ethyl, propyl, butyl, octyl, and the like.

Reaction between the amino-halo-alkyne and tetrahydroisoquinoline may be conveniently effected under liquid reaction conditions as by use of an inert organic solvent. Such solvents as those named above may also be employed for this reaction. To promote the reaction, it is preferred to employ elevated temperatures, such as the reflux temperature. Although an excess of either reactant may be used, it is generally advisable to employ stoichiometric ratios. Upon termination of the reaction, the desired product is recovered by conventional procedures.

This reaction leads directly to the formation of acid addition and quaternary ammonium salts of the desired products which may be recovered as the salt or the free base. Treatment of the salts with an appropriate amount of an inorganic basic substance converts the salts to the free base.

Representative of the tetrahydroisoquinoline derivatives which may be formed by this process are N-(4-dimethylamino-2-butynyl)-1,2,3,4-tetrahydroisoquinoline, N-(4-diethylamino-2-butynyl)-1,2,3,4-tetrahydroisoquinoline, N-[(4-(N-pyrrolidino)-2-butynyl)]-1,2,3,4-tetrahydroisoquinoline, N-(4-N¹-piperidino-2-butynyl)-1,2,3,4-tetrahydroisoquinoline, N-[4-(N-morpholino)-2-butynyl]-1,2,3,4-tetrahydroisoquinoline and similar compounds in which the butyne group is replaced by other alkynes such as 2-pentyne, 3-hexyne, 3-heptyne, 4-octyne, 6-dodecyne, 7-pentadecyne and the like.

The free base of such compounds may be converted to acid addition and quaternary ammonium salts by reacting the free base with up to two moles of an acid or alkyl ester of an acid.

Mineral acids such as sulfuric acid or hydrochloric acid, or organic acids such as formic acid and citric acid, may be used to form salts.

Quaternary ammonium salts are readily produced by contacting the alkyne with an alkyl ester of mineral and organic acids such as methyl chloride, ethyl bromide, methyl sulfate and so forth.

These novel tetrahydroisoquinoline derivatives and salts thereof are potent hypotensive agents and, therefore, are useful in alleviating hypertension. They may be formulated in the conventional pharmaceutical forms for this purpose, such as tablets, capsules, solutions and the like.

The following examples are presented to show methods of producing certain of the novel compounds included within this invention. It is understood, however, that these examples are included only for purposes of illustration, and that the invention is not to be restricted to the embodiments specifically disclosed therein.

EXAMPLE 1

*1-dimethylamino-4-bromo-2-butyne-methobromide*

$$Br-CH_2C \equiv C-CH_2N(CH_3)_2 \cdot CH_3Br$$

To 26.5 g. (0.125 mole) of 1,4-dibromo-2-butyne dissolved in 60 cc. of benzene was added 4.0 g. (0.068 mole) of trimethylamine with occasional cooling. A gummy mass precipitated which was crystallized from isopropyl alcohol (75 cc.) and separated by filtration. Yield 18 g., M. P. 142–143° C. dec.

*Analysis.*—Calcd. for $C_7H_{13}Br_2N$: Br⁻, 29.50; Br, 59.0. Found: Br⁻, 29.51; Br, 59.8.

EXAMPLE 2

*N-(4-dimethylamino-2-butynyl)-1,2,3,4-tetrahydroisoquinoline dimethobromide*

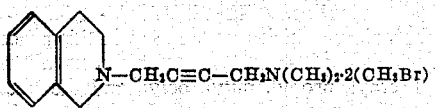

A mixture containing 10.0 g. (0.037 mole) of 1-dimethylamino-4-bromo-2-butyne methobromide, 5.5 g. (0.037 mole) of N-methyl-1,2,3,4-tetrahydroisoquinoline and 75 cc. of isopropyl alcohol was refluxed for two hours, cooled and the precipitate separated by filtration, M. P. 201° C. dec., yield 13 g. (84%). The crude product was suspended in 75 cc. of hot isopropyl alcohol, the suspension cooled and the precipitate isolated by filtration: 10 g.; M. P. 208° C. dec.

*Analysis.*—Calcd. for $C_{17}H_{26}Br_2N_2$: Br, 38.30; N, 6.71. Found: Br, 38.96; N, 6.56.

EXAMPLE 3

*N-(4-dimethylamino-2-butynyl)-1,2,3,4-tetrahydroisoquinoline dimethobromide*

To 0.125 mole of the oily 1-bromo-4-diethylamino-2-butyne methobromide prepared as in Example 1 and dissolved in 60 cc. of acetonitrile was added 10.3 g. (0.070 mole) of N-methyl-1,2,3,4-tetrahydroisoquinoline. The mixture was allowed to stir until a crystalline precipitate appeared, which was isolated by filtration and recrystallized from 450 cc. of isopropyl alcohol. Yield 13 g.; M. P. 200–201° C. dec.

*Analysis.*—Calcd. for $C_{19}H_{30}Br_2N_2$: Br, 35.82; N, 6.27. Found: Br, 35.63; N, 6.28.

EXAMPLE 4

*1-bromo-4-pyrrolidino-2-butyne methobromide*

This compound was prepared from 1,4-dibromo-2-butyne and N-methyl-pyrrolidine in benzene as described in Example 1. The oily product was utilized in the subsequent reaction.

EXAMPLE 5

*N-[(4-(N-pyrrolidino)-2-butynyl)]-1,2,3,4-tetrahydroisoquinoline dimethobromide*

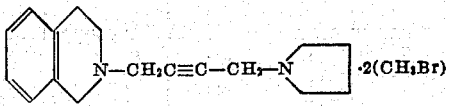

To 0.07 mole of the colorless oil, 1-bromo-4-pyrrolidino 2-butyne methobromide, of Example 4, dissolved in 75 cc. of hot acetonitrile was added 10.0 g. (0.070 mole) of N-methyl-1,2,3,4-tetrahydroisoquinoline. The brown oil which precipitated crystallized on further stirring. The product was isolated by filtration and recrystallized from ethanol, M. P. 203–204° C. Yield 7.0 g.

*Analysis.*—Calcd. for $C_{19}H_{28}Br_2N_2$: Br, 36.07; N, 6.31. Found: Br, 36.24; N, 6.21.

EXAMPLE 6

*1-bromo-4-N¹-piperidino-2-butynyl methobromide*

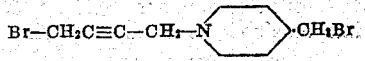

To 26.5 g. (0.125 mole) of 1,4-dibromo-2-butyne in 60 cc. of anhydrous benzene were added 8.5 g. (0.085 mole) of N-methylpiperidine in 20 cc. of benzene. An oily product precipitated. The benzene layer was decanted and the oil dissolved in 50 cc. of acetonitrile. An insoluble precipitate was removed by filtration. The acetonitrile filtrate was used in the subsequent reaction.

EXAMPLE 7

*N-(4-N¹-piperidino-2-butynyl)-1,2,3,4-tetrahydroisoquinoline dimethobromide*

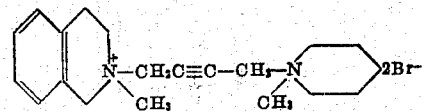

To the acetonitrile solution of 1-bromo-4-N¹-piperidino-2-butynyl methobromide (Example 6) was added 13.2 g. (0.09 mole) of N-methyl-1,2,3,4-tetrahydroisoquinoline in 100 cc. of acetonitrile. The oil which precipitated soon crystallized on further stirring; 29 g. of a pink solid were isolated by filtration and recrystallized from 240 cc. of ethanol. Yield 18 g.; M. P. 224–225° C. dec.

*Analysis.*—Calcd. for $C_{20}H_{30}Br_2N_2$: Br, 34.98; N, 6.13. Found: Br, 35.71; N, 6.07.

EXAMPLE 8

*N-[4-(N-morpholino)-2-butynyl]-1,2,3,4-tetrahydroisoquinoline dimethobromide*

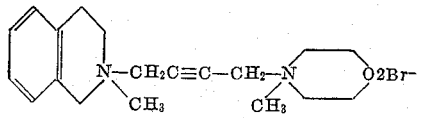

To 8.0 g. (0.026 mole) of 1-bromo-4-N-morpholino-2-butynyl methobromide—prepared as per Example 1—suspended in 80 cc. of ethanol was added 4.0 g. (0.028 mole) of N-methyl-1,2,3,4-tetrahydroisoquinoline in 50 cc. of ethanol. The resulting mixture was refluxed with stirring for one hour and the solution clarified by filtration. The filtrate yielded a crystalline precipitate on standing. Yield 3.0 g., M. P. 219–220° C.

*Analysis.*—Calcd. for $C_{19}H_{26}Br_2N_2O$: Br, 34.80; N, 6.08. Found: Br, 32.80; N, 6.02.

Various changes and modifications of the invention can be made and, to the extent that such variations incorporate the spirit of this invention, they are intended to be included within the scope of the appended claims.

What is claimed is:

1. A compound of the formula

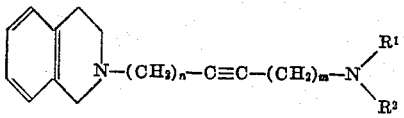

wherein $m$ and $n$ are integers from 1 through 5, and $R'$ and $R^2$ are members of the group consisting of lower alkyl groups, phenyl-lower alkyl groups, phenyl groups, lower alkenyl groups and heterocyclic groups formed by joining $R'$ and $R^2$ of the group consisting of pyrrolidino, piperidino and morpholino groups, and nontoxic acid addition and quaternary ammonium salts thereof.

2. N-(4-di-loweralkylamino-2-alkynyl)- 1,2,3,4-tetrahydroisoquinoline in which the alkynyl group is more than 3 carbons and less than 11 carbons.

3. N-(4-di-loweralkylamino-2-alkynyl)- 1,2,3,4-tetrahydroisoquinoline di-loweralkylhalide salt in which the alkynyl group is more than 3 carbons and less than 11 carbons.

4. N-[(4-N-pyrrolidino)- 2-alkynyl]-1,2,3,4-tetrahydroisoquinoline in which the alkynyl group is more than 3 carbons and less than 11 carbons.

5. N-[(4-N-pyrrolidino)-2-alkynyl]-1,2,3,4-tetrahydroisoquinoline di-loweralkylhalide salt in which the alkynyl group is more than 3 carbons and less than 11 carbons.

6. N-(4-N'-piperidino-2-alkynyl)-1,2,3,4-tetrahydroisoquinoline in which the alkynyl group is more than 3 carbons and less than 11 carbons.

7. N-(4-N'-piperidino-2-alkynyl)-1,2,3,4-tetrahydroisoquinoline di-loweralkylhalide salt in which the alkynyl group is more than 3 carbons and less than 11 carbons.

8. N-[4-(N-morpholino)-2-alkynyl]-1,2,3,4-tetrahydroisoquinoline in which the alkynyl group is more than 3 carbons and less than 11 carbons.

9. N-[4-(N-morpholino)-2-alkynyl]-1,2,3,4-tetrahydroisoquinoline di-loweralkylhalide salt in which the alkynyl group is more than 3 carbons and less than 11 carbons.

10. N-(4-dimethylamino-2-butynyl)- 1,2,3,4-tetrahydroisoquinoline.

11. N-(4-diethylamino-2-butynyl)- 1,2,3,4 - tetrahydroisoquinoline.

12. N-[4-N-pyrrolidino)-2-butynyl)] - 1,2,3,4 - tetrahydroisoquinoline.

13. N-(4-N'-piperidino-2-butynyl)-1,2,3,4 - tetrahydroisoquinoline.

14. N-[4-(N-morpholino)- 2-butynyl]-1,2,3,4 - tetrahydroisoquinoline.

15. The process which comprises reacting a compound of the formula

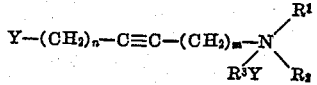

with a compound of the formula

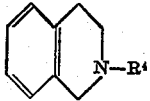

to produce a compound of the formula

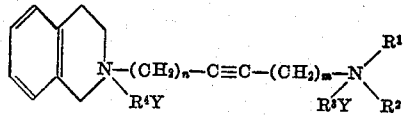

wherein Y is a member of the group consisting of chlorine, bromine and iodine, $m$ and $n$ are integers from 1 through 5, and $R'$ and $R^2$ are members of the group consisting of lower alkyl groups, phenyl-lower alkyl groups, phenyl groups, lower alkenyl groups and heterocyclic groups formed by joining $R'$ and $R^2$ of the group consisting of pyrrolidino, piperidino and morpholino groups, and $R^3$ and $R^4$ are members of the group consisting of hydrogen and lower alkyl groups.

References Cited in the file of this patent

FOREIGN PATENTS 896,810     Germany _____ Nov. 16, 1953

U. S. DEPARTMENT OF COMMERCE
PATENT OFFICE

CERTIFICATE OF CORRECTION

Patent No. 2,830,049     John H. Biel     April 8, 1958

It is hereby certified that error appears in the printed specification of the above numbered patent requiring correction and that the said Letters Patent should read as corrected below.

Column 4, line 2, for "N-(4-dimethylamino-2-" read -- N-(4-diethylamino-2- --.

Signed and sealed this 1st day of July 1958.

(SEAL)
Attest:
KARL H. AXLINE
Attesting Officer

ROBERT C. WATSON
Commissioner of Patents